(12) United States Patent
Cannon

(10) Patent No.: US 10,427,580 B2
(45) Date of Patent: Oct. 1, 2019

(54) CARGO TANK ASSEMBLIES WITH GROUND LEVEL ACCESS

(71) Applicant: Wabash National, L.P., Lafayette, IN (US)

(72) Inventor: John F. Cannon, Fond du Lac, WI (US)

(73) Assignee: Wabash National, L.P., Lafayette, IN (US)

( * ) Notice: Subject to any disclaimer, the term of this patent is extended or adjusted under 35 U.S.C. 154(b) by 275 days.

(21) Appl. No.: 15/447,808

(22) Filed: Mar. 2, 2017

(65) Prior Publication Data

US 2017/0253168 A1    Sep. 7, 2017

Related U.S. Application Data

(60) Provisional application No. 62/303,751, filed on Mar. 4, 2016, provisional application No. 62/309,049, filed on Mar. 16, 2016.

(51) Int. Cl.

| | |
|---|---|
| *B60P 3/22* | (2006.01) |
| *F17C 5/02* | (2006.01) |
| *F17C 13/04* | (2006.01) |
| *F17C 13/06* | (2006.01) |
| *F17C 13/08* | (2006.01) |
| *B62D 63/06* | (2006.01) |

(52) U.S. Cl.
CPC ............. *B60P 3/226* (2013.01); *B60P 3/2255* (2013.01); *F17C 5/02* (2013.01); *F17C 13/04* (2013.01); *F17C 13/06* (2013.01); *F17C 13/083* (2013.01); *B62D 63/06* (2013.01); *F17C 2205/0332* (2013.01); *F17C 2205/0394* (2013.01); *F17C 2227/0135* (2013.01)

(58) Field of Classification Search
CPC ......... B60P 3/226; B60P 3/2255; B60P 3/221; B60P 3/22; F17C 5/02; F17C 13/083; B62D 63/06; B65D 88/00
See application file for complete search history.

(56) References Cited

U.S. PATENT DOCUMENTS

| | | | | |
|---|---|---|---|---|
| 2,826,421 | A * | 3/1958 | Mueller | ................ B60P 3/2225 |
| | | | | 220/817 |
| 3,078,004 | A * | 2/1963 | Randolph | .............. B61D 5/008 |
| | | | | 105/358 |
| 3,577,739 | A * | 5/1971 | Botkin | .................... B60P 3/225 |
| | | | | 137/210 |
| 2015/0307013 | A1 | 10/2015 | Tremblay et al. | |

OTHER PUBLICATIONS

LNG Transport Trailers, Pressure Transport Unit, Marketing Publication, 2013, 2 pages.

* cited by examiner

*Primary Examiner* — Andrew T Kirsch
*Assistant Examiner* — Don M Anderson
(74) *Attorney, Agent, or Firm* — Quarles & Brady LLP

(57) ABSTRACT

A cargo tank assembly can include a cargo tank, and a plurality of access ports for the cargo tank, including a manway. A cabinet can be arranged to provide ground-level access to the plurality of access ports. In some embodiments, the cabinet can provide a sole breakable seal for a set of equipment, or for the cargo tank.

18 Claims, 6 Drawing Sheets

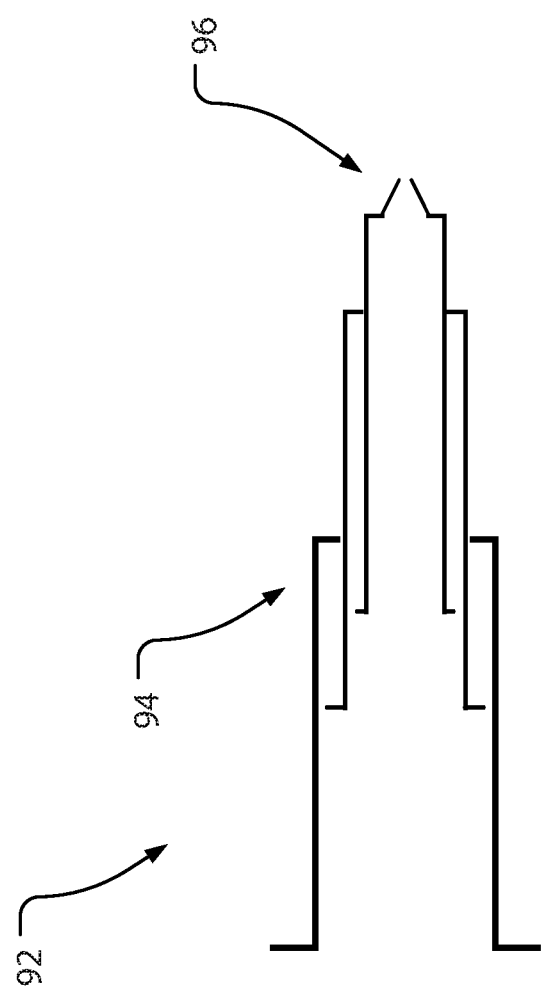

CARGO TANK ASSEMBLIES WITH GROUND LEVEL ACCESS

RELATED APPLICATIONS

This application claims the benefit of U.S. Provisional Patent Application No. 62/303,751, which was filed Mar. 4, 2016, and U.S. Provisional Patent Application No. 62/309,049, which was filed on Mar. 16, 2016. The entire disclosures of each of these applications are incorporated herein by reference.

FIELD OF THE DISCLOSURE

The present disclosure relates generally to storage containers. In particular, the present disclosure relates to mobile cargo tanks, including cargo tanks for transportation trailers.

BACKGROUND

Mobile cargo tanks can be used in different contexts to transport liquids, solids, sludges, slurries, mixed and pure liquids, and other materials. For example, storage tank vehicles such as chemical trucks can include a cargo tank trailer, configured to be hauled by a semi-trailer truck. Other arrangements can include cargo tanks configured for use with train carriages, with tanker trucks, or otherwise. In some configurations, cargo tanks can be designed to hold pressurized contents. In some configurations, contents can be non-pressurized.

In conventional mobile cargo tank designs, a manway and other equipment, such as inlet ports or couplings, can be disposed on, and extend through, a top or roof of the relevant tank. This can be useful, for example, in order to allow access into an interior storage area of the tank or to vent vapor or otherwise relieve excess pressure from the storage area. In some cases, a ladder can be provided for access to the tank roof, and the manway and other equipment can be surrounded by a balcony. Accordingly, during inspection and other operations (e.g., cleaning of the tank), an operator may be required to climb a ladder and clear a balcony (or other features) in order to access the manway and other tank inlets.

In different installations, conventional cargo tanks can also include a number of seals between the interior storage area of the tanks and the external environment. For example, seals can be provided on manway covers, at tank inlets (or outlets), at hose fittings (or other fittings), and so on. This can be useful, for example, to help to ensure appropriate material containment and handling of materials carried by the cargo tank. However, because operational procedures may require regular inspection of all relevant seals, the inclusion of multiple seals can require an operator to devote substantial time to seal inspection over the course of loading, transport, unloading, and other operations.

SUMMARY

In order to improve accessibility for manways, inlet couplings, and other equipment for cargo tanks, as well as other benefits, it may be useful to locate the manways, couplings, and other equipment relatively low on a body of a cargo tank. In this way, for example, a user may not need to climb a ladder, reach or climb over a balcony, or undertake other similar endeavors to conduct necessary inspections, cleaning, and maintenance.

As an additional benefit, because the need for user access to a tank roof may be reduced (e.g., eliminated), it may be possible to improve the aerodynamic profile of a cargo tank at or near various ports, fittings, or other equipment. For example, in some configurations, a jacket (e.g., as part of a housing) can be disposed around a liquid (or other) tank, with an appropriately aerodynamic profile. Because a user may not need to regularly access various ports, valves, fittings, hoses, and other equipment at the top of the tank, the jacket can be configured to fully enclose the ports, valves, fittings, hoses, and so on at the top of the tank. Accordingly, the various ports, valves, fittings, hoses, and so on can be shielded from drag forces, enabling a more streamlined and efficient profile for the tank to be maintained.

In some cases, it may be further useful to arrange a cabinet to surround a manway, one or more couplings, and other equipment for a cargo tank. This can, for example, allow an operator to access all of the contained manway, couplings, and other equipment via a single access point (e.g., as accessible from ground level). Further, where the cabinet is formed with an appropriate seal, it may be possible not only for the cabinet to appropriately contain materials, but also may provide a greatly reduced number of seals (e.g., a single seal) that requires inspection. As such, an operator may be able to satisfy requirements for seal inspections in significantly reduced time.

Embodiments of the invention can improve on conventional cargo tank designs by incorporating one or more of the features generally noted above, or other features.

According to some aspects of the invention, a cargo tank assembly can include a cargo tank configured for transport of pressurized materials, a plurality of access ports for the cargo tank, a vapor recovery system, and a cabinet. The plurality of access ports can include a manway and one or more of an inlet port to fill the cargo tank, an outlet port to empty the cargo tank, a cleaning port, and an inspection port. The vapor recovery system can include a vapor-recovery fitting configured to attach to an external conduit to discharge vapor from the cargo tank. The cabinet can be arranged to enclose the plurality of access ports and the vapor-recovery fitting, the cabinet thereby providing ground-level access to the plurality of access ports and the vapor-recovery fitting.

According to some aspects of the invention, a cargo tank assembly can include a cargo tank configured for transport of pressurized materials, a plurality of access ports for the cargo tank, and a cabinet with a breakable seal. The plurality of access ports can include a manway and one or more of an inlet port to fill the cargo tank, an outlet port to empty the cargo tank, a cleaning port, and an inspection port, and none of the plurality of access ports may include a breakable seal. The cabinet can be arranged to enclose the plurality of access ports to provide ground-level access to the plurality of access ports, and can include a breakable seal for access to the interior of the cargo tank via the plurality of access ports.

According to some aspects of the invention, a method of manufacture for a cargo tank can include forming a cargo tank with an internal area, forming a plurality of access ports for the cargo tank, and disposing a cabinet to enclose the plurality of access ports so that the cabinet provides ground-level access to the plurality of access ports. The access ports can include a manway and one or more of an inlet port to fill the cargo tank, an outlet port to empty the cargo tank, a cleaning port, and an inspection port.

According to some aspects of the invention, a cargo tank trailer can include a tank supported above ground underlying the cargo tank trailer. The tank can include a vessel formed to define an internal storage area arranged to store products therein and a manway coupled to the vessel to allow access into the internal storage area of the vessel by a user standing on the ground.

In some embodiments, the cargo tank trailer can further include a frame configured to be supported on the ground underlying the cargo tank trailer. The tank can be coupled to the frame for movement therewith.

In some embodiments, the tank can further includes piping systems including a vapor recovery system. The vapor recovery system can include a first end that is in fluid communication with the internal storage area of the vessel and a second end that is accessible by the user standing on the ground.

In some embodiments, the tank can further include a housing arranged around the vessel. A vapor recovery system can be located between the vessel and the housing to block access to the vapor recovery system.

In some embodiments, the vessel can include a top end, and a bottom end spaced apart from the top end to locate the bottom end of the vessel between the top end of the vessel and the ground. A venting system can include a pressure-relief vent coupled to the top of the vessel and located between the vessel and the housing, with the pressure-relief vent in fluid communication with the internal storage area of the tank.

In some embodiments, the venting system can further include a vent hose located between the vessel and the housing. The vent hose can have a first end in fluid communication with the pressure-relief vent and a second end that opens to atmosphere toward the bottom end of the vessel.

In some embodiments, the vessel can include a shell, a front tank head, and a rear tank head that cooperate to define the internal storage area. The shell can extend between a front and rear end of the vessel. The front tank head can coupled to the shell at the front end of the vessel and the rear tank head is coupled to the shell at the rear end of the vessel. The manway can be coupled to the rear tank head, or to the shell.

In some embodiments, the housing can include a cabinet coupled to an outer jacket of the housing, with the cabinet is arranged around the manway. The cabinet can be movable between a closed arrangement in which access to the manway is blocked, and an opened arrangement in which access to the manway is allowed.

In some embodiments, the cabinet can include a frame coupled to the tank, a door coupled to the frame, and a seal coupled to the door. The seal can be configured to seal the cabinet when the cabinet is in the closed arrangement.

In some embodiments, the cabinet can be coupled to the housing toward the rear tank head.

In some embodiments, the housing can further include an outer jacket arranged around the vessel. The outer jacket can be arranged around the piping systems to locate the piping systems between the outer jacket and the vessel to block access to the piping systems.

In some embodiments, the vessel can extend along a longitudinal axis of the cargo tank trailer and a cross-section of the outer jacket taken generally perpendicular to the longitudinal axis can be non-circular.

In some embodiments, the housing can further include a plurality of ribs located between the vessel and the outer jacket. The ribs can include a first arcuate portion having a first radius of curvature and a second arcuate portion having a second radius of curvature greater than the first radius of curvature.

In some embodiments, the first arcuate portion can extend circumferentially around the longitudinal axis by a first distance, the second arcuate portion can extend circumferentially around the longitudinal axis by a second distance, with the first distance being greater than the second distance.

In some embodiments, the rear tank head can be formed to include a first aperture sized to receive a telescoping cleaning system. The rear tank head can be formed to include a second aperture sized to receive an inspection device.

According to some aspects of the invention, a method of manufacturing a cargo tank trailer can include a number of operations. The method can include coupling a first tank head to a first end of a tank shell, and coupling a second tank head to a second end of a tank shell to form a vessel having an internal storage area. The formed vessel can include a top end, a bottom end spaced apart from the top end, and a longitudinal axis that extends between the first and second tank heads and is located about midway between the top end and the bottom end. The method can further include coupling a manway to one of the first tank head, the second tank head, and the tank shell to cause a portion of the manway to be located between the longitudinal axis and the bottom end of the vessel.

In some embodiments, the method can further includes coupling a vapor recovery system with the vessel. The vapor recovery system can include a first end opening into the internal storage area and a second end located between the longitudinal axis and the bottom end of the vessel.

In some embodiments, the method can further include coupling a venting system with the vessel. The venting system can include a vent opening into the internal storage area and a hose. The hose can have a first end in fluid communication with the vent, and a second end located between the longitudinal axis and the bottom end of the vessel.

In some embodiments, the method can further include coupling a plurality of ribs to the shell and arranging an outer jacket around the ribs. The outer jacket can block access to the first end of the vapor recovery system and to the vent included in the venting system.

In some embodiments, the method can further include coupling a cabinet to one of the vessel and the outer jacket, with the cabinet arranged around the manway.

These and other features of the present disclosure will become more apparent from the following figures and description of example embodiments.

BRIEF DESCRIPTION OF THE DRAWINGS

FIG. 7 is a schematic view of a telescoping cleaning system for use with the cargo tank trailer of FIG. 1.

DETAILED DESCRIPTION

Figure 1:
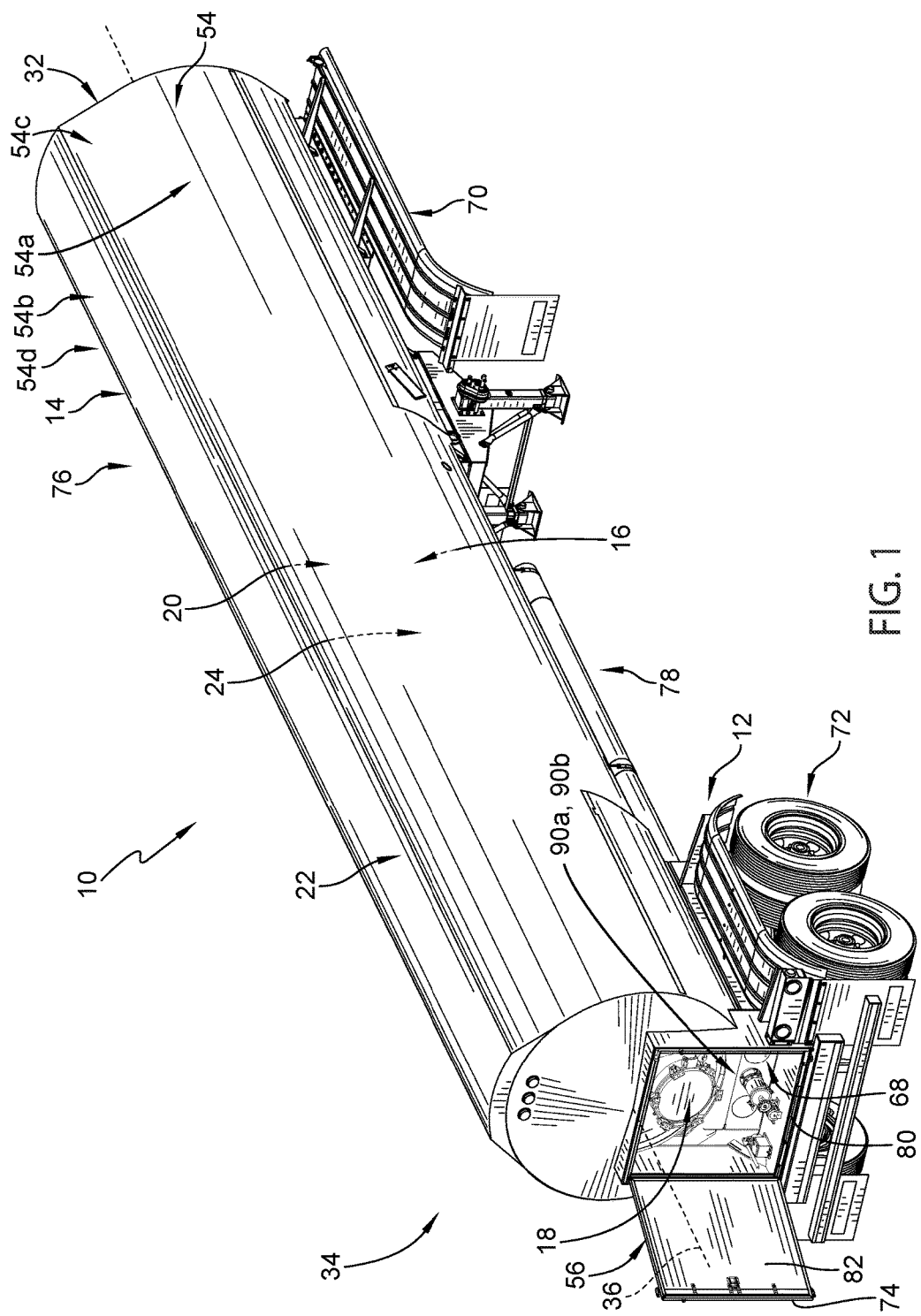
FIG. 1 is a top, left, rear, isometric view of a cargo tank trailer configured in accordance with an embodiment of the invention.

For the purposes of promoting an understanding of the principles of the disclosure, reference will now be made to example embodiments shown in the attached drawings and specific language will be used to describe the same. However, before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. For example, while some concepts of this disclosure are described below in relation to a cargo tank trailer, it will be understood that these and other concepts may also be applied in the context of other mobile storage containers or various stationary storage containers.

Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items, as appropriate.

Unless otherwise specified or limited, the phrases "at least one of A, B, and C," "one or more of A, B, and C," and the like, are meant to indicate A, or B, or C, or any combination of A, B, and/or C, including combinations with single or multiple instances of A, B, and/or C. Likewise, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise specified or limited, "ground-level" and similar terms are meant to describe a device, feature, or system that can be generally accessed by operators without the need for the operators to scale ladders or other similar devices.

As used herein in the context of seals, unless otherwise specified or limited, "permanent" is meant to describe a seal that is not configured to be broken during normal operation and maintenance. For example, a weld can provide a permanent seal, as can a line or other formation of caulk or other sealant between two components that are not generally configured to move relative to each other so as to break caulk or sealant. In contrast, unless otherwise specified or limited, "breakable" is meant to describe a seal that is configured to be broken during normal operation and maintenance. For example, a gasket or other seal that surrounds an access door or other equipment can provide a breakable seal, where the access door or other equipment is configured to be opened and closed (thereby temporarily "breaking" the seal) during normal operation and maintenance. Generally, for the purposes of this disclosure, mere contact between two structural members (e.g., a manway and a hatch for the manway) is not considered a "seal," unless a separate sealing material (e.g., rubber or silicone) is disposed between the members.

As noted above, it may be useful to provide a cargo tank that includes ground level access to components such as a manway for interior access, inlet or outlet ports and fittings, valves, ducts, controls, and other equipment. Further, it may be useful to provide a cargo tank with an enclosed top profile despite the presence of equipment at the exterior of the top of a containment vessel of the cargo tank. It may also be useful to provide a unified access point for a variety of equipment, including manways, inlet or outlet ports, and so on, with limited numbers of seals relating to the access point and the relevant equipment. Embodiments of the invention, including those expressly discussed below, can provide one or more of these (or other) benefits.

FIGS. 1 through 6 illustrate aspects of an example cargo tank in accordance with one embodiment of the invention, configured as part of a cargo tank trailer 10. As illustrated, the cargo tank trailer 10 is configured as a DOT 407 stainless steel chemical trailer, although other configurations (including non-trailer configurations) are possible.

Generally, the cargo tank trailer 10 includes a frame 12 supported on ground underlying the cargo tank trailer 10, and a cargo tank 14 supported on the frame 12. The frame 12 of the illustrated cargo tank trailer 10 is configured to be propelled by a semi-trailer truck (not shown), and accordingly includes a carriage 70 configured to couple to a fifth wheel of the semi-trailer truck and a plurality of wheels 72 coupled with the carriage 70. In other embodiments, the frame 12 can instead be configured to be propelled by a locomotive or other motive equipment.

Figure 6:
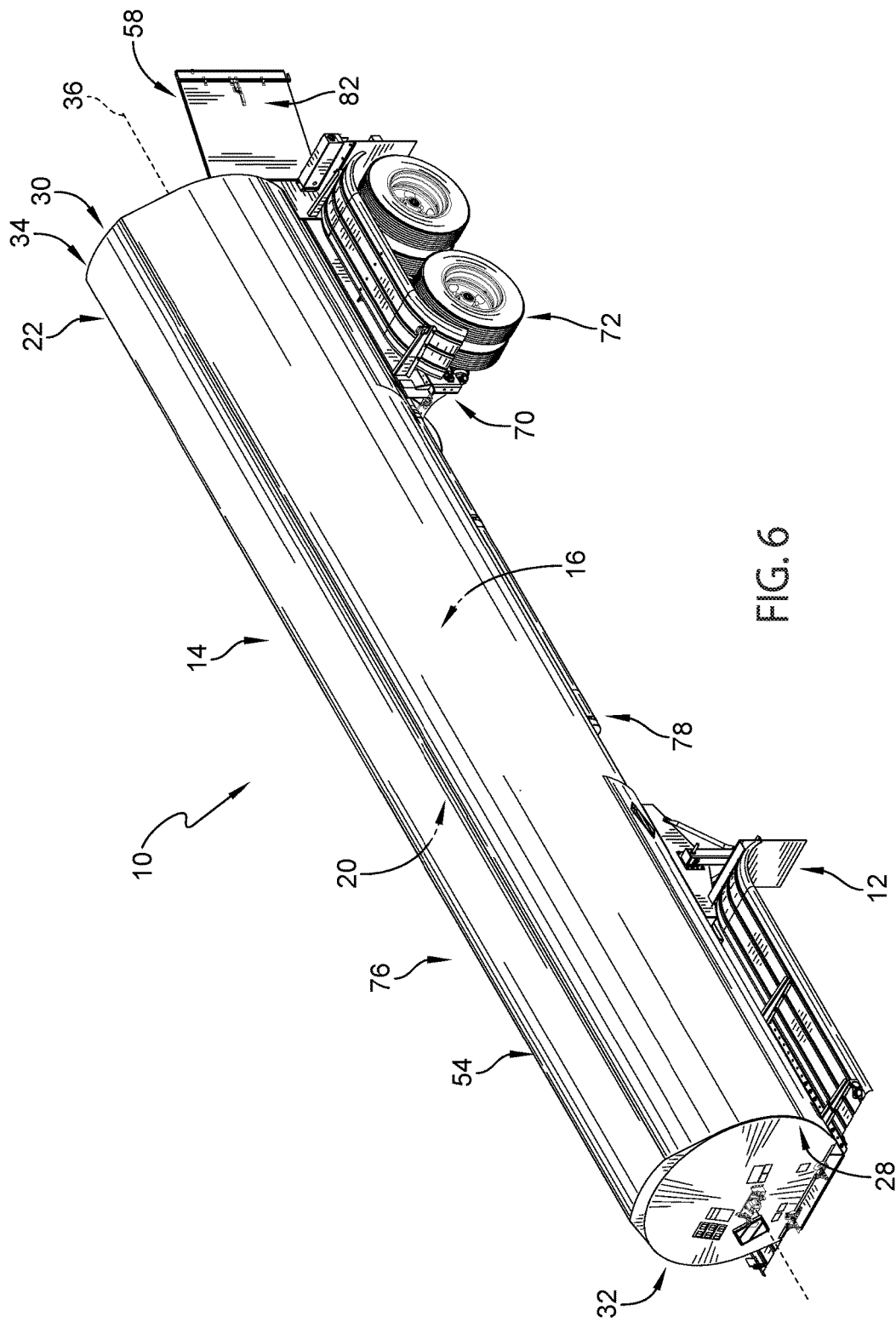
FIG. 6 is a top, right, front isometric view of a front of the cargo tank trailer of FIG. 1.

As illustrated in FIGS. 1 and 6, in particular, the top of the cargo tank trailer 10 does not include external equipment, such as manways, vents or other access ports, related fittings, and so on. As such, as also discussed below, routine work and maintenance may be performed at ground level and it may not be necessary for an operator to regularly access a top of the cargo tank trailer 10. Correspondingly, the cargo tank trailer 10 does not include a ladder, top walkway, top balcony, or other similar features.

Figure 2:
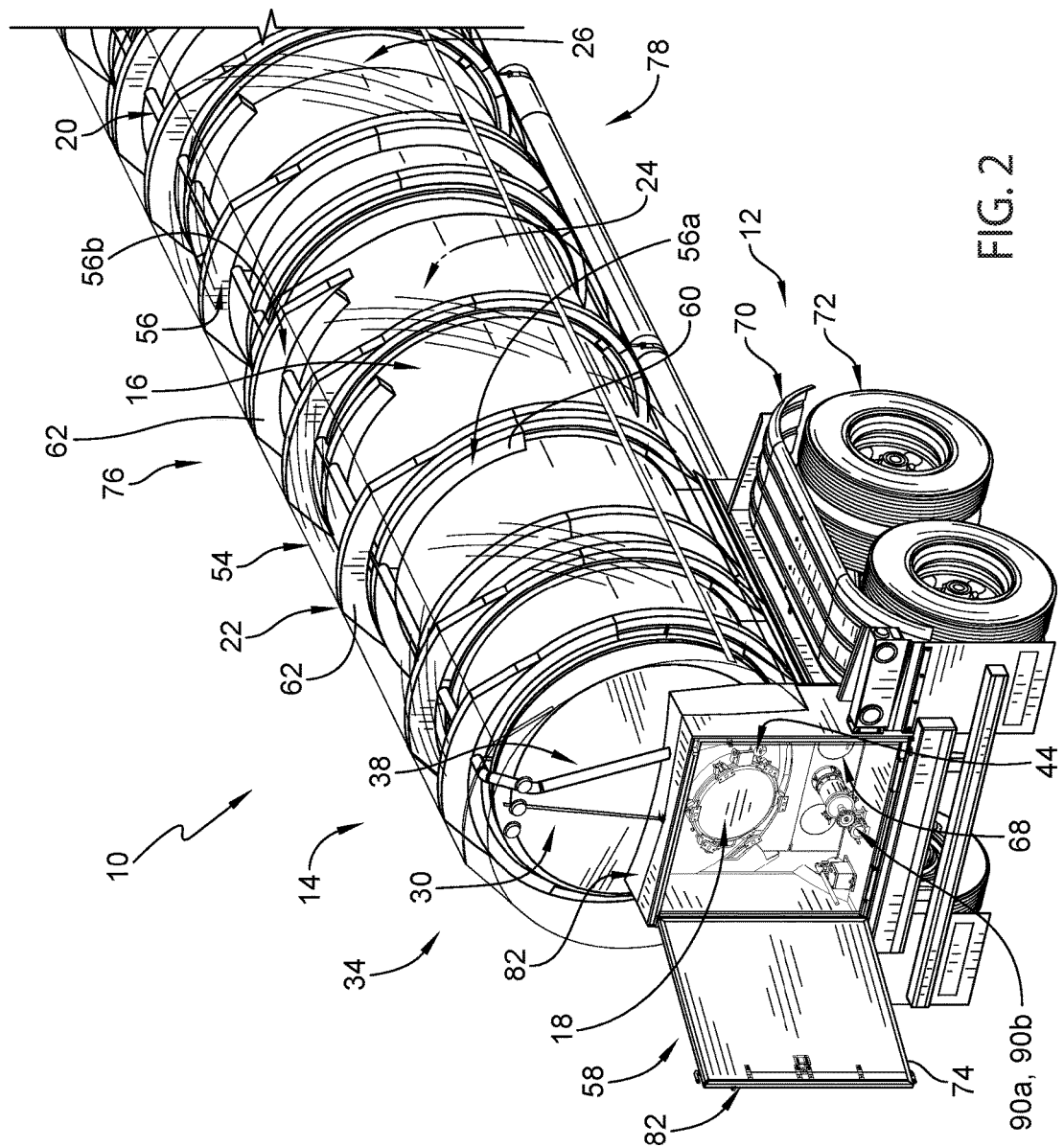
FIG. 2 is a partial view of the cargo tank trailer of FIG. 1, from a similar perspective as FIG. 1, with an outer jacket of the trailer rendered transparently to illustrate a vessel, and support ribs located between the vessel and the outer jacket.

As illustrated in FIG. 2 in particular, the cargo tank 14 is formed to include a vessel 16 that defines an internal storage area 24 configured to store and transport materials (e.g., pressurized fluids). Generally, a vessel for a cargo tank can be insulated or non-insulated, pressurized or non-pressurized, and configured for single or multiple loads. Likewise, a vessel for a cargo tank can include structures formed from aluminum, carbon steel, stainless steel, fiberglass reinforced plastic, or any of a variety of other materials. In the embodiment illustrated, the vessel 16 is configured as a non-insulated, pressurized tank (e.g., as rated for pressurization to 25 psi), with a shell 26, a front tank head 28, and a rear tank head 30 (see, e.g., FIGS. 2 and 6). The shell 26 generally extends along a longitudinal axis 36 of the cargo tank 14 between a front end 32 and a rear end 34 of the cargo tank 14. The front tank head 28 is coupled to the shell 26 at the front end 32 and the rear tank head 30 is coupled to the shell 26 at the rear end 34. As such, the shell 26, the front tank head 28, and the rear tank head 30 generally cooperate to define the internal storage area 24.

The cargo tank 14 further includes a top end 76, and a bottom end 78 spaced apart from the top end 76 to locate the bottom end 78 between the top end 76 and ground. In the embodiment illustrated, the longitudinal axis 36 is positioned about midway between the top end 76 and the bottom end 78 of the vessel 16.

Figure 5:
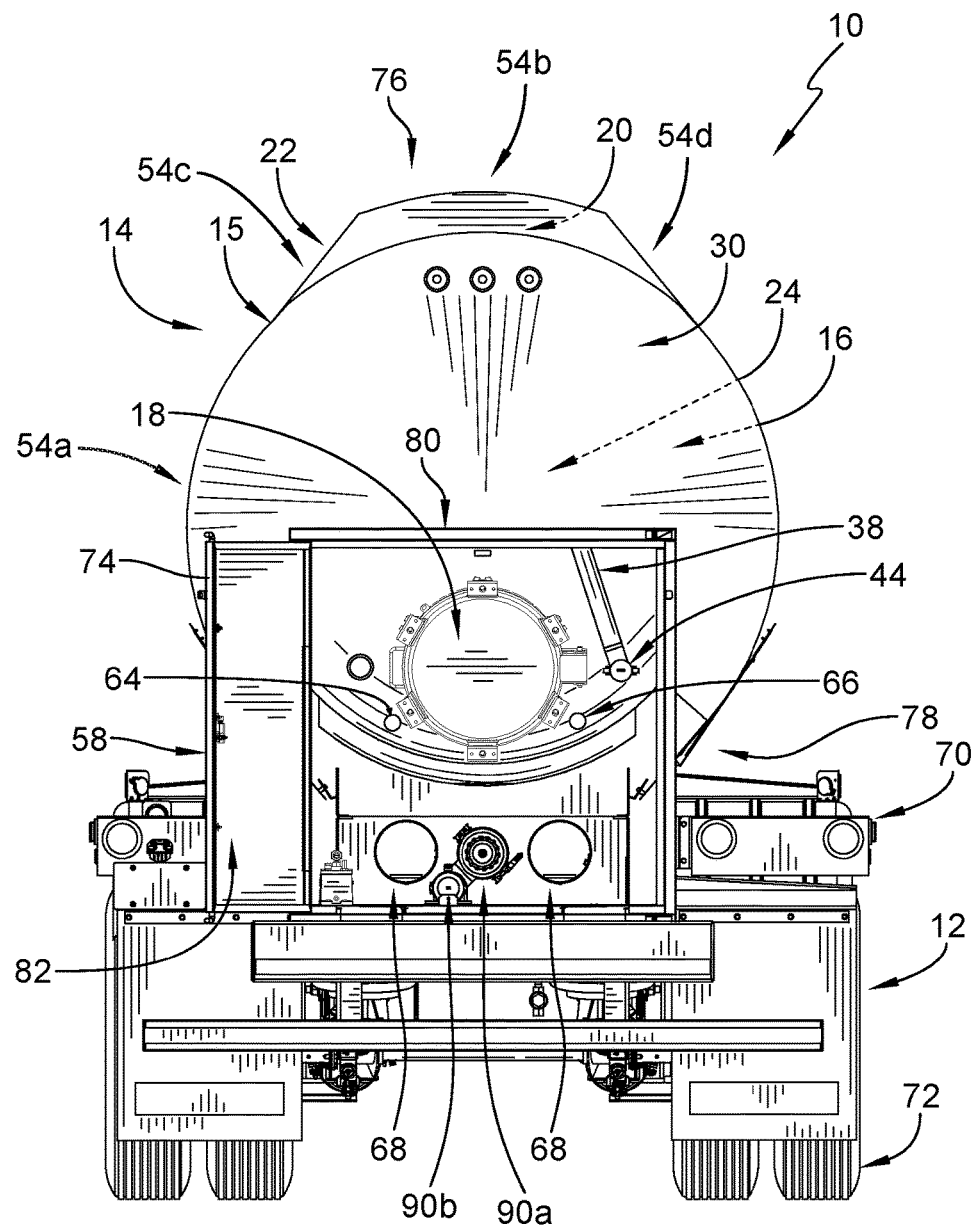
FIG. 5 is a rear elevation view of the cargo tank trailer of FIG. 1.

The cargo tank 14 also includes a piping system 20, as also discussed below, as well as a plurality of ports, which can be coupled to the vessel 16 to allow access into the internal storage area 24 by a user standing at ground level (e.g., on the ground). For example, as illustrated in FIGS. 1, 2, and 5 in particular, the cargo tank 14 includes a manway 18, hose apertures 68, inlet and outlet ports 90a and 90b for filling and emptying the vessel 16, respectively, a cleaning port 64, and an inspection port 66 (see FIG. 5), all of which can provide access to the internal storage area 24 in various ways and for various operations.

As also noted above, in some embodiments, it may be useful to dispose a manway on a cargo tank in order to allow ground-level access to the interior of the cargo tank, via the manway. To this end, for example, it may be useful to couple the manway 18 to the vessel 16 so that a portion of the manway 18 is located below the longitudinal axis 36. Indeed, in the embodiment illustrated, the entire manway 18 is located below the longitudinal axis 36 (see FIG. 1).

Generally, one or more manways configured for ground-level access can be coupled to a tank at one or more locations. In the embodiment illustrated, the manway 18 is coupled to the rear tank head 30. This may be useful, for example, in order to dispose the manway 18 near other ports and equipment. In other embodiments, however, the manway 18 can be disposed at other locations, including at locations on the shell 26 or on the front tank head 28.

As also noted above, the vessel 16 is configured to include various ports and equipment other than the manway 18. For example, as illustrated in FIG. 5, the rear tank head 30 also includes the cleaning port 64, which is generally sized to receive a relevant cleaning system. This arrangement may be useful, for example, in order for the vessel 16 to be used to store and transport materials that may prohibit the installation of a permanent cleaning system within the vessel 16. For example, a cleaning system can be carried with the cargo tank 14, but not permanently installed in the cleaning port 64, and can be selectively received by the cleaning port 64 only when cleaning operations are to be undertaken.

In some embodiments, the cleaning port 64 can be configured to receive a telescoping cleaning system, such as a cleaning system 92 with a telescoping wand 94 and a cleaning head 96, as illustrated in FIG. 7. In some embodiments, the cleaning port 64 can be configured to facilitate tank cleaning with a pipe that can be anchored at a front bulkhead of the vessel 16 (not shown).

As also illustrated in FIG. 5, the rear tank head 30 further includes an inspection port 66 for an inspection device (not shown). For example, an optical or other inspection device (not shown) can be inserted through the aperture 66, as appropriate, in order to inspect various internal features of the vessel 16. In some embodiments, an inspection device (e.g., like a cleaning system) can be configured to be received in the aperture 66 only temporarily, and can be stored elsewhere when not in use.

In the embodiment illustrated, the cleaning and inspection apertures 64 and 66 are generally between two and three inches in diameter. Likewise, the apertures 64 and 66 are disposed, generally symmetrically, on opposite sides of the manway 18. In other embodiments, other configurations are possible, including configurations with differently sized or located apertures, configurations with different numbers of apertures, and so on.

In the embodiment illustrated, the cargo tank trailer 10 further includes hose apertures 68 configured to store and transport hoses for use with the cargo tank 14. As with the manway 18 and the cleaning and inspection apertures 64 and 66, the hose apertures 68 are disposed generally adjacent to the rear tank head 30. Accordingly, the cargo tank 14 can afford an operator ground level access, from a single location (i.e., at the rear of the cargo tank 14), to a variety of equipment including the manway 18, the apertures 64, 66, and 68, and so on. Further, because an operator may not need to climb to the top of the cargo tank 14 for routine inspection and maintenance (e.g., access operations via the manway 18), external ladders for accessing the top of the cargo tank 14, and other similar equipment, can be omitted from the cargo tank 14. This can allow for more aerodynamic configuration of the cargo tank 14, generally, as also discussed below.

In some embodiments, a cargo tank can include a housing configured to enclose part or all of a containment vessel of the cargo tank, as well as various equipment secured to the vessel. For example, in the embodiment illustrated, the cargo tank 14 includes a housing 22. As illustrated in FIGS. 1 and 2 in particular, the housing 22 is generally arranged around the vessel 16 to limit access to the vessel 16, the piping system 20 (as also discussed below), and other equipment, and to provide, as appropriate, an aerodynamic profile for the cargo tank 14 as a whole.

In the embodiment illustrated, the housing 22 includes an outer jacket 54, a plurality of internal ribs 56, and a cabinet 58. The outer jacket 54 is disposed to generally surround the shell 26, the front tank head 28, and the rear tank head 30 of the vessel 16. The ribs 56 are disposed between the vessel 16 and the outer jacket 54, and are generally configured to support the outer jacket 54 relative to the vessel 16.

In some embodiments, although a vessel may be generally cylindrical, an outer jacket for the vessel may be somewhat non-cylindrical. This may be useful, for example, in order to allow the outer jacket to cover various fittings or other equipment, while still providing a relatively streamlined cross-section during transport. In the embodiment illustrated, for example, although the vessel 16 is generally cylindrical, a cross-section of the outer jacket 54 taken generally perpendicular to the longitudinal axis 36 is non-circular. As illustrated in FIG. 1 in particular, the cross-section of the outer jacket 54 includes a first portion 54a having a first radius of curvature and a second portion 54b having a second radius of curvature that is greater than the first radius of curvature. Generally similar third and fourth portions 54c and 54d of the outer jacket 54 interconnect the first and second portions 54a and 54b, in order to provide a fully closed profile for the outer jacket 54. This configuration can be useful, for example, in order for the second portion 54b of the outer jacket 54 to provide internal space to accommodate the piping system 20 (and other equipment) in addition to the vessel 16 itself.

To support the second portion 54b of the outer jacket 54, the ribs 56 generally include a first arcuate portion 60 having a first radius of curvature and a second arcuate portion 62 having a second radius of curvature greater than the first radius of curvature, as illustrated in FIG. 2 in particular. The first arcuate portion 60 extends circumferentially around the longitudinal axis 36 by a first distance, generally extending over the sides and/or bottom of the vessel 16, but not necessarily over the top of the vessel 16. The second arcuate portion 62 extends circumferentially around the longitudinal axis 36 by a second distance that is somewhat smaller than the first distance, generally extending over a top portion of the vessel 16, but not substantially over the sides or bottom of the vessel 16. Accordingly, the ribs 56 can generally conform to, and support, the non-cylindrical profile of the outer jacket 54. In some embodiments, including as illustrated in FIG. 2, certain of the ribs 56 may include only an instance of the first arcuate portion 60 (e.g., as with the rib 56a), or only an instance of the second arcuate portion 62

(e.g., as with the rib 56b), rather than both. For the rib 56a, that the first arcuate portion 60 extends over the top portion of the vessel 16. As noted above, this may not generally be true for other instances of the first arcuate portion 60.

In the embodiment illustrated, the multiple instances of the first arcuate portion 60 generally exhibit the same curvature, and generally extend to similar degrees around the vessel 16. Likewise, the multiple instances of the second arcuate portion 62 generally exhibit the same curvature, and generally extend to similar degrees around the vessel 16. As noted above, however, there are exceptions to this general rule, including with regard to the rib 56a. Further, in other embodiments, other arrangements are possible. For example, different ribs to support an outer jacket can be configured to exhibit any variety of different configurations, including as may result in a profile of the relevant outer jacket that substantially varies along the longitudinal length of the relevant cargo tank.

The ribs 56 can be formed in various ways. In some embodiments, the ribs 56 can be formed from foam, can be formed from a rigid (e.g., metallic) material, or can include a combination of foam structures and rigid (e.g., metallic) structures. Accordingly, for example, a set of ribs (e.g., the ribs 56) can generally be designed to provide an appropriate balance between structural stability and overall weight, while also potentially serving as thermal insulators for the relevant cargo tank (e.g., to insulate against heat flow between the outer jacket 54 and the vessel 16).

Figure 4:
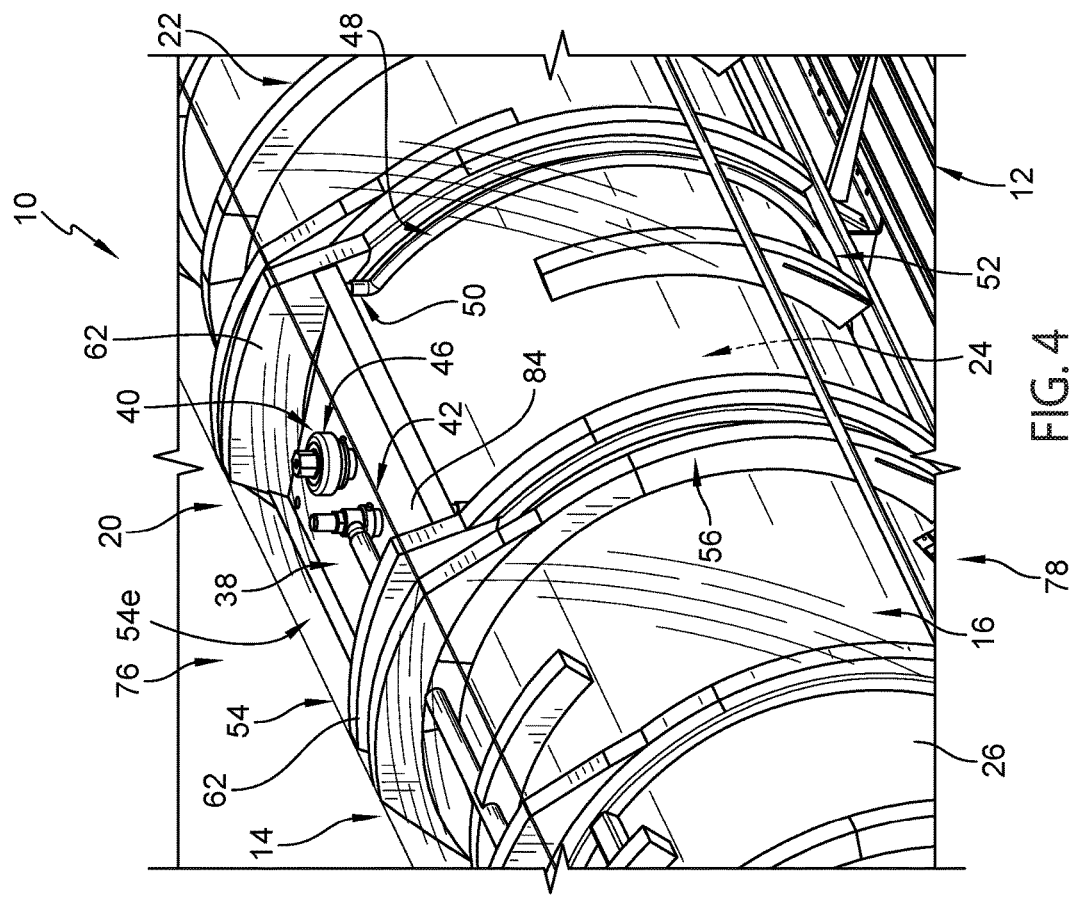
FIG. 4 is a partial top, left, rear isometric view of a similar portion of the cargo tank trailer of FIG. 1 as is shown in FIG. 3, illustrating a venting system and a vapor recovery system for the cargo tank trailer.
Figure 3:
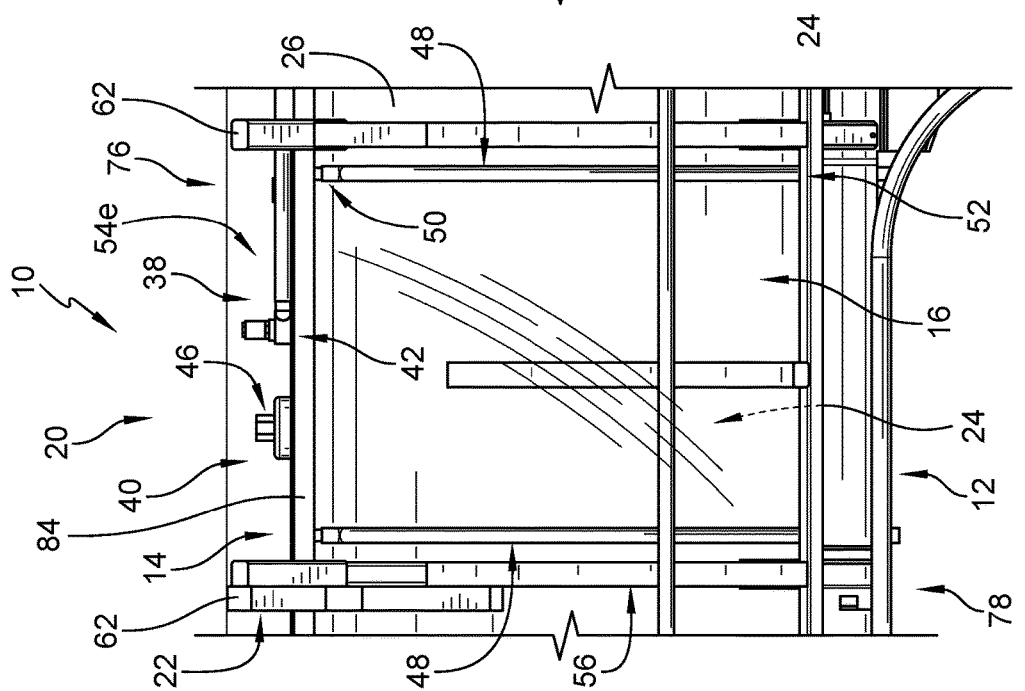
FIG. 3 is a partial right side elevation view of the cargo tank trailer of FIG. 1, also with the outer jacket of the trailer rendered transparently.

Usefully, the outer jacket 54 (and the housing 22, generally) can be used to enclose a variety of different equipment for the cargo tank 14. For example, in the embodiment illustrated, the outer jacket 54 substantially surrounds the piping system 20. In the embodiment illustrated, the piping system 20 is generally configured for use to vent the internal storage area 24 of the vessel 16, and to recover vapors from the internal storage area 24. Accordingly, as illustrated in FIGS. 3 and 4 in particular, the piping system 20 includes a vapor recovery system 38 and a venting system 40 as shown in FIGS. 3 and 4. In other embodiments, other configurations are possible.

Generally, it may be useful to arrange the outer jacket 54 to enclose as substantial a portion of the piping system 20 as is possible, in order to generally protect components of the piping system 20, as well as to shield the components from drag and thereby provide a generally more streamlined profile for the relevant cargo tank. In the cargo tank trailer 10, for example, the outer jacket 54 of the housing 22 generally encloses almost all of the piping system 20, except at select locations (e.g., at the cabinet 58).

Generally, a piping system or other equipment to be enclosed by a housing of a cargo tank can be disposed at any number of locations on the cargo tank. As illustrated in FIG. 3 in particular, a number of parts of the piping system 20, including ports into the vessel 16 for the vapor recovery system 38 and for the venting system 40, are located within a front-most compartment 54e that is defined by the outer jacket 54, by the internal ribs 56 of the housing 22, and a floor portion 84 (e.g., a foam floor plate). However, other components of the piping system 20 extend to other parts of the cargo tank trailer 10, as also discussed below.

As illustrated in FIGS. 3 through 5 in particular, the vapor recovery system 38 generally extends from a port and a corresponding tank vapor-recovery fitting 42 within the compartment 54e, along piping 38a, to an external-attachment vapor-recovery fitting 44 (see FIG. 5) at the rear tank head 30 of the vessel 16. Generally, the tank fitting 42 can be configured to allow vapor to flow out of (or into) the top of the internal storage area 24 of vessel 16 at the compartment 54e. Similarly, the external-attachment fitting 44 can be configured to be coupled to an external system (e.g., an offloading tank and/or pump system) in order to allow vapor to flow out of (or into) the vapor recovery system 38 generally. Accordingly, as appropriate, vapor can be drawn from (or discharged into) the vessel 16 via the tank fitting 42 and can be discharged from (or drawn into) the vapor recovery system 38 at the external-attachment fitting 44.

Notably, because the external-attachment fitting 44 is disposed for ground-level access, an operator can execute vapor recovery operations without necessarily having to climb to the top of the cargo tank 14 in order to directly access the fitting 44 (e.g., to attach an external conduit and thereby close a flow loop for a larger vapor recovery arrangement). Correspondingly, routine access to the tank fitting 42 within the compartment 54e, as well as routine access to the piping 38a (outside of the cabinet 58), is generally blocked by the continuous configuration of the outer jacket 54. This arrangement, for example, can discourage un-necessary climbing of the cargo tank 14 by operators, while also providing an improved aerodynamic profile for the cargo tank 14, despite the equipment (e.g., the tank fitting 42) extending from the top of the vessel 16.

In the embodiment illustrated, the external-attachment fitting 44 is disposed for ground level access within a compartment that is fully enclosed by the cabinet 58. Accordingly, in order to access the external-attachment fitting 44 (e.g., to attach an external conduit to close a vapor-recovery loop), an operator can simply open the cabinet 58. Similarly to the discussion above, therefore, the illustrated arrangement (and others) can provide an operator the benefits of single-location, ground level access to the external-attachment fitting 44, as well as other frequently used equipment (e.g., the manway 18, the apertures 64, 66, and 68, and so on).

In some embodiments, still other systems and equipment can be enclosed and accessed in a similar fashion as the vapor recovery system 38. As illustrated in FIGS. 3 and 4, for example, the venting system 40 includes a pressure-relief vent 46 (or other valve) that is coupled to the top end of the vessel 16 to be in fluid communication with the internal storage area 24. The pressure-relief vent 46 is generally configured to allow gases from inside the vessel 16 to escape to atmosphere when the vessel 16 is being filled, and to allow gases from the atmosphere to enter the internal storage area 24 of the vessel 16 when the product stored in the vessel 16 is being discharged.

Similarly to the tank fitting 42 of the vapor recovery system 38, the pressure-relief vent 46 is fully enclosed by the outer jacket 54. Accordingly, the pressure-relief vent and other equipment of the venting system 40 can be shielded from drag forces during travel. In the embodiment illustrated, the pressure-relief vent 46 is disposed within the compartment 54e, along with the tank fitting 42. In some embodiments, the tank fitting 42, the pressure-relief vent 46, or other fittings (or equipment) can instead be disposed within different compartments of the housing 22.

In the embodiment illustrated, the pressure-relief vent 46 vents directly to (and from) the compartment 54e, which is at least partially sealed relative to other compartments of the housing 22. In order to route gases to and from the compartment 54e, the cargo tank 14 further includes a vent hose 48 (or other conduit) that is disposed between the vessel 16 and the housing 22. Generally, the vent hose 48 has a first end 50 in fluid communication with the compartment 54e (and, thereby, the pressure-relief vent 46). Correspondingly, a second end 52 of the vent hose 48 opens to atmosphere toward the bottom end of the vessel 16.

As with the external-attachment fitting 44 of the vapor recovery system 38, routine access to the pressure-relief vent 46 and the first end 50 of the vent hose 48 is generally blocked by the outer jacket 54. Further, as also discussed above, the second end 52 of the vent hose 48 is generally disposed for ground-level access. Accordingly, an operator can execute various operations relating to pressure relief without necessarily having to climb to the top of the cargo tank 14 to directly access the pressure-relief vent 46 or the compartment 54e. In the embodiment illustrated, the second end 52 of the vent hose is disposed outside of the cabinet 58. In other embodiments, other configurations are possible.

In view of the discussion above, it will be recognized that the top of the cargo tank 14, in contrast to conventional designs, does not include certain ports or other equipment that are configured to be accessed for regular operations and maintenance. This may be generally useful, for example, in order to reduce (e.g., eliminate) the need for an operator to climb to the top of the cargo tank 14 in order to perform routine operations (e.g., routine inspection and maintenance). Further, ports and other equipment that are disposed to the exterior (e.g., at the top) of the cargo tank 14 are substantially enclosed by the outer jacket 54, as may protect the equipment and improve the aerodynamic characteristics of the cargo tank 14 as a whole. In other embodiments, similar arrangements can be made for any number of ports, fittings, or other equipment.

As also discussed above, it may sometimes be useful to provide single-location, ground-level access for routinely used systems. In some embodiments, it may also be useful for the single-location, ground-level access to be selectively enclosed (e.g., closable by a user). To this end, for example, as illustrated in FIG. 5 in particular, the cabinet 58 is disposed adjacent to the rear tank head 30, and generally encloses the manway 18, the apertures 64, 66, and 68, the inlet and outlet ports 90a and 90b, and the external-attachment fitting 44 of the vapor recovery system 38, as well as various other equipment (e.g., onboard pumps for the cargo tank trailer 10).

Generally, the cabinet 58 includes a frame 80 coupled to the cargo tank 14, a closeable door 82 coupled to the frame 80, and a seal 74 (e.g., a rubber or silicone gasket) coupled to the door 82 and configured to seal the cabinet 58 when the cabinet 58 is in the closed arrangement. (In other embodiments, the seal 74 can instead, or additionally, be coupled to the frame 80.) Accordingly, the cabinet 58 is movable between a closed arrangement in which the cabinet 58 is sealed and access to the manway 18 and other internal equipment is blocked, and an opened arrangement in which the cabinet 58 is unsealed and access to the manway 18 and other internal equipment is allowed. Accordingly, an operator can readily access equipment for inspecting, cleaning, filling, and emptying the vessel 16 via the single access opening provided by the closeable door 82 of the cabinet 58.

As appropriate, the cabinet 58 can be coupled to the outer jacket 54 or to the vessel 16. In the embodiment illustrated, for example, the cabinet 58 is configured to seat closely against the rear tank head 30, with a silicone or other permanent seal between the cabinet 58 and the rear tank head 30. Further, the cabinet 58 is configured to be permanently attached to the out jacket 54 of the housing 22 (e.g., via tack or stich welds). In other embodiments, other configurations are possible.

In some embodiments, providing single-location, ground-level access for systems of a cargo tank (e.g., via the cabinet 58) can also provide a single breakable seal for the cargo tank, which can generally replace one or more breakable seals that might typically be provided on individual equipment to which the ground-level access is provided. This can, for example, significantly reduce the number of seals that require routine inspection by operators, thereby significantly reducing the amount of inspection time required for the relevant tank.

As noted above, for example, the cabinet door 82, when closed, is configured to form a breakable seal with the remainder of the cabinet 58 via the seal 74. Correspondingly, in some embodiments, access ports into the vessel 16 that are disposed within the cabinet 58 can be configured not to include seals. For example, the manway 18 can be configured with a door that directly contacts the vessel 16, rather than having a silicone, rubber, or other seal disposed between the door and the vessel 16. Accordingly, the seal 74 for the cabinet 58 can provide a single breakable seal for the entire tank trailer 10, and an operator may need to routinely inspect only the seal 74, rather than the seal 74 and separate seals for each of the manway 18, the inlet and outlet ports 90a and 90b, the apertures 64, 66, and 68, and so on.

Consistent with the discussion above, it may be useful to manufacture, as well as use, cargo tanks according to the invention. For example, according to one method of manufacturing for the cargo tank trailer 10, the front tank head 28 is coupled to the front end 32 of the shell 26 and the rear tank head 30 is coupled to the rear end 34 of the shell 26, in order to form the vessel 16 and the internal storage area 24.

Before, during, or after formation of the vessel 16, components of the manway 18 are coupled to at least one of the front tank head 28, the rear tank head 30, and the shell 26 so that at least part of the manway 18 is located between the longitudinal axis 36 and the bottom end 78 of the vessel 16. In this way, for example, ground-level access to the vessel 16 can be provided via the manway.

In some implementations, the cabinet 58 is also coupled to the vessel 16, to surround the manway 18, as well as other equipment, and thereby providing single-location, ground-level access to the manway 18 and the other equipment. In some implementations, the cabinet is configured with a breakable seal (e.g., the seal 74), while equipment within the cabinet for accessing the internal storage area 24 of the vessel are not equipped with breakable seals.

Thus, embodiments of the invention may provide improved cargo tanks relative to conventional designs. For example, by providing single-location, ground-level access for a variety of equipment, embodiments of the invention may decrease the need for operators to climb to the top of a cargo tank, while also generally improving the efficiency of any number of routine (or other) operations. Further, by disposing certain equipment within a housing of a cargo tank, including in combination with providing the noted ground-level access, the general aerodynamic profile of a cargo tank may be improved.

In other embodiments, other benefits are also possible. For example, when a manway or other port is disposed on a lower half of a cargo tank, opening the manway or other port can tend to naturally vent heavier-than-air materials (e.g., pure nitrogen) out of the cargo tank. Accordingly, operators may not be required to rely on more time consuming purging operations to ensure that a cargo tank has been appropriately evaporated (e.g., before undertaking internal maintenance or cleaning).

While the disclosure has been illustrated and described in detail in the foregoing drawings and description, the same is to be considered as exemplary and not restrictive in character, it being understood that only example embodiments thereof have been shown and described and that all changes and modifications that come within the spirit of the disclosure are desired to be protected.

The invention claimed is:

1. A cargo tank assembly comprising:
a cargo tank configured for transport of pressurized materials;
a plurality of access ports for the cargo tank, including a manway and one or more of an inlet port to fill the cargo tank, an outlet port to empty the cargo tank, a cleaning port, and an inspection port;
a vapor recovery system, including a vapor-recovery fitting configured to attach to an external conduit to discharge vapor from the cargo tank;
a cabinet arranged to enclose the plurality of access ports and the vapor-recovery fitting, the cabinet thereby providing ground-level access to the plurality of access ports and the vapor-recovery fitting; and
a housing with an outer jacket that is spaced apart from the cargo tank;
wherein the cabinet is arranged to provide ground-level access to within the outer jacket;
wherein the vapor recovery system includes a vapor-recovery port at a top end of the cargo tank and vapor-recovery piping that extends outside of the cabinet between the vapor-recovery fitting and vapor-recovery port; and
wherein the outer jacket encloses the vapor-recovery piping and the vapor-recovery port.

2. The cargo tank assembly of claim 1, wherein the plurality of access ports are disposed on one of a front head and a rear head of the cargo tank; and
wherein the plurality of access ports includes the cleaning port.

3. The cargo tank assembly of claim 2, wherein the cleaning port is configured to receive a telescoping cleaning system.

4. The cargo tank assembly of claim 1, wherein the outer jacket includes an at least partly non-cylindrical profile.

5. The cargo tank assembly of claim 4, wherein a top portion of the at least partly non-cylindrical profile includes a first arcuate portion having a first radius of curvature and a second arcuate portion having a second radius of curvature greater than the first radius of curvature.

6. The cargo tank assembly of claim 1, wherein the outer jacket at least partly defines a closed compartment at the top end of the cargo tank, with the vapor-recovery port enclosed within the closed compartment.

7. The cargo tank assembly of claim 6 wherein the closed compartment further encloses a pressure relief valve for the cargo tank.

8. The cargo tank assembly of claim 6 wherein the outer jacket is supported by a plurality of foam ribs, at least two of which at least partly define the closed compartment.

9. The cargo tank assembly of claim 1, wherein none of the plurality of access ports include a breakable seal; and
wherein the cabinet includes a breakable seal to seal the cabinet when the cabinet is closed, the cabinet thereby providing the only breakable seal for access to the interior of the cargo tank via the plurality of access ports.

10. A cargo tank assembly comprising:
a cargo tank configured for transport of pressurized materials;
a plurality of access ports for the cargo tank, including a manway and one or more of an inlet port to fill the cargo tank, an outlet port to empty the cargo tank, a cleaning port, and an inspection port; and
a cabinet with a breakable seal, the cabinet being arranged to enclose the plurality of access ports to provide ground-level access to the plurality of access ports;
with none of the plurality of access ports including a breakable seal, so that the cabinet provides the only breakable seal for access to the interior of the cargo tank via the plurality of access ports.

11. The cargo tank assembly of claim 10, wherein the breakable seal for the cabinet is disposed on a closeable door of the cabinet.

12. The cargo tank assembly of claim 10, wherein the plurality of access ports includes the cleaning port.

13. The cargo tank assembly of claim 12, wherein the cleaning port is configured to receive a telescoping cleaning system.

14. The cargo tank assembly of claim 10, further comprising:
a vapor recovery system, including a vapor-recovery fitting configured to attach to an external conduit to discharge vapor from the cargo tank to an external system;
wherein the cabinet provides ground-level access to the vapor-recovery fitting.

15. The cargo tank assembly of claim 14, further comprising a housing with an outer jacket that is spaced apart from and substantially surrounds the cargo tank;
wherein the vapor recovery system includes a vapor-recovery port at a top end of the cargo tank and vapor-recovery piping that extends outside of the cabinet between the vapor-recovery fitting and the vapor-recovery port; and
wherein the outer jacket encloses the vapor-recovery piping and the vapor-recovery port.

16. The cargo tank assembly of claim 15, wherein the outer jacket includes an at least partly non-cylindrical profile; and
wherein the outer jacket at least partly defines a closed compartment at the top end of the cargo tank, with the vapor-recovery port enclosed within the closed compartment.

17. A method of manufacture for a cargo tank assembly, the method comprising:
forming a cargo tank with an internal area;
forming a plurality of access ports for the cargo tank, including a manway and one or more of an inlet port to fill the cargo tank, an outlet port to empty the cargo tank, a cleaning port, and an inspection port;
disposing a cabinet to enclose the plurality of access ports so that the cabinet provides ground-level access to the plurality of access ports; and
forming a breakable seal for the cabinet, to seal the cabinet when the cabinet is closed;
wherein none of the plurality of access ports include a breakable seal, so that the cabinet provides the only breakable seal for access to an interior of the cargo tank via the plurality of access ports.

18. A method of manufacture for a cargo tank assembly, the method comprising:
forming a cargo tank with an internal area;
forming a plurality of access ports for the cargo tank, including a manway and one or more of an inlet port to fill the cargo tank, an outlet port to empty the cargo tank, a cleaning port, and an inspection port;

disposing a cabinet to enclose the plurality of access ports so that the cabinet provides ground-level access to the plurality of access ports;
attaching a vapor recovery system to the cargo tank; and
forming a housing with an outer jacket for the cargo tank;
wherein the vapor recovery system includes a vapor-recovery fitting configured to attach to an external conduit to discharge vapor from the cargo tank;
wherein the vapor-recovery fitting is enclosed by the cabinet, with the cabinet providing ground-level access to the vapor-recovery fitting; and
wherein the outer jacket is configured to enclose the vapor recovery system outside of the cabinet.

* * * * *